United States Patent
Gupta et al.

(10) Patent No.: US 11,593,180 B2
(45) Date of Patent: Feb. 28, 2023

(54) CLUSTER SELECTION FOR WORKLOAD DEPLOYMENT

(71) Applicant: KYNDRYL, INC., New York, NY (US)

(72) Inventors: Manish Gupta, New Delhi (IN); Gopal S Pingali, Bangalore (IN); Kiranmai Bhagavatula, Bangalore (IN)

(73) Assignee: KYNDRYL, INC., New York, NY (US)

( * ) Notice: Subject to any disclaimer, the term of this patent is extended or adjusted under 35 U.S.C. 154(b) by 181 days.

(21) Appl. No.: 17/122,666

(22) Filed: Dec. 15, 2020

(65) Prior Publication Data
US 2022/0188172 A1 Jun. 16, 2022

(51) Int. Cl.
*G06F 9/50* (2006.01)
*G06N 3/02* (2006.01)
*H04L 67/1021* (2022.01)
*H04L 67/61* (2022.01)

(52) U.S. Cl.
CPC .......... *G06F 9/5077* (2013.01); *G06F 9/5038* (2013.01); *G06N 3/02* (2013.01); *H04L 67/1021* (2013.01); *H04L 67/61* (2022.05)

(58) Field of Classification Search
None
See application file for complete search history.

(56) References Cited

U.S. PATENT DOCUMENTS

| | | | |
|---|---|---|---|
| 7,020,713 B1 * | 3/2006 | Shah | H04L 49/90 370/395.32 |
| 8,806,015 B2 | 8/2014 | Dutta et al. | |
| 9,069,599 B2 | 6/2015 | Martinez et al. | |
| 9,900,402 B1 * | 2/2018 | Li | H04L 67/1008 |
| 9,912,740 B2 | 3/2018 | Richardson et al. | |
| 9,979,674 B1 * | 5/2018 | Kumar | H04L 43/16 |
| 10,742,593 B1 * | 8/2020 | Vasquez | H04L 67/1097 |
| 10,908,940 B1 * | 2/2021 | Farhan | H04L 41/0806 |
| 2004/0249939 A1 * | 12/2004 | Amini | H04L 67/1001 709/225 |

(Continued)

FOREIGN PATENT DOCUMENTS

| | | |
|---|---|---|
| CN | 106027643 A | 10/2016 |
| EP | 2024847 A4 | 2/2009 |

OTHER PUBLICATIONS

"Creating and managing placement rules", IBM, Printed Oct. 12, 2020, 7 pages.

(Continued)

*Primary Examiner* — Adam Lee
(74) *Attorney, Agent, or Firm* — John Kennel; Andrew M. Calderon; Calderon Safran & Cole P.C.

(57) ABSTRACT

In an approach, a processor receives a request to deploy a workload in a container environment, where: the container environment comprises a plurality of external providers running container environment clusters; and the request (i) includes one or more requirements of the workload and (ii) does not specify a particular external provider of the plurality of external providers. A processor determines a cluster, from the plurality of external providers running the container environment clusters, that meets the one or more requirements of the workload. A processor deploys the workload on the determined cluster.

18 Claims, 6 Drawing Sheets

(56) References Cited

U.S. PATENT DOCUMENTS

| | | | |
|---|---|---|---|
| 2006/0074970 A1* | 4/2006 | Narayanan | G06F 11/3476 707/999.102 |
| 2010/0235355 A1* | 9/2010 | Carter | G06F 9/505 709/224 |
| 2011/0096675 A1 | 4/2011 | Li et al. | |
| 2011/0231899 A1 | 9/2011 | Pulier et al. | |
| 2013/0143504 A1* | 6/2013 | Devara | H04W 52/0258 455/67.11 |
| 2014/0244879 A1* | 8/2014 | Myrah | G06F 13/409 710/300 |
| 2014/0278808 A1 | 9/2014 | Iyoob et al. | |
| 2015/0081926 A1* | 3/2015 | White | H04L 61/5007 709/245 |
| 2015/0347183 A1* | 12/2015 | Borthakur | G06F 9/5088 718/105 |
| 2017/0097841 A1* | 4/2017 | Chang | H04L 12/4633 |
| 2017/0126795 A1* | 5/2017 | Kumar | H04L 41/5012 |
| 2017/0134253 A1* | 5/2017 | Wang | H04L 67/101 |
| 2018/0103088 A1* | 4/2018 | Blainey | H04L 41/0893 |
| 2018/0205669 A1 | 7/2018 | Chang et al. | |
| 2019/0026030 A1* | 1/2019 | Yang | G06F 3/0688 |
| 2019/0034237 A1 | 1/2019 | Siddappa et al. | |
| 2019/0130110 A1* | 5/2019 | Lee | G06F 21/57 |
| 2020/0028935 A1 | 1/2020 | Sahay et al. | |
| 2020/0118039 A1* | 4/2020 | Kocberber | G06N 5/003 |
| 2020/0142753 A1* | 5/2020 | Harwood | G06F 9/52 |
| 2020/0169342 A1* | 5/2020 | Venkatraman | H03C 3/40 |
| 2020/0279151 A1* | 9/2020 | Li | G06N 5/022 |
| 2020/0310852 A1* | 10/2020 | Featonby | G06F 9/5027 |
| 2021/0049050 A1* | 2/2021 | Goodwin | G06F 9/5038 |
| 2021/0141655 A1* | 5/2021 | Gamage | G06F 9/45545 |
| 2021/0141675 A1* | 5/2021 | Yang | G06F 9/5016 |
| 2021/0157858 A1* | 5/2021 | Stevens | G06F 16/90335 |
| 2021/0255884 A1* | 8/2021 | Van Rotterdam | H04L 67/10 |

OTHER PUBLICATIONS

"Application Management using IBM Cloud Pak for Multicloud Management", IBM Cloud Architecture Center, Printed Dec. 13, 2020, 40 pages, <https://www.ibm.com/cloud/garage/dte/tutorial/multi-cluster-application-management>.

"Creating a deployment policy", IBM Knowledge Center, Printed Dec. 13, 2020, 2 pages, <https://www.ibm.com/support/knowledgecenter/SSBS6K_3.2.x/manage_policies/create_policy.html>.

"Creating OpenShift clusters", IBM, Dec. 7, 2020, 27 pages, <https://cloud.ibm.com/docs/openshift?topic=openshift-clusters>.

"Deployment Models", Istio, Printed Dec. 14, 2020, 16 pages, <https://istio.io/latest/docs/ops/deployment/deployment-models/>.

"DNS for Services and Pods", Kubernetes, Oct. 2, 2020, 6 pages, <https://kubernetes.io/docs/concepts/services-networking/dns-pod-service/>.

"Labels and Selectors", Kubernetes, Printed Oct. 10, 2020, 5 pages, <https://kubernetes.io/docs/concepts/overview/working-with-objects/labels/>.

"OpenShift Container Platform 4.6 Documentation", Red Hat OpenShift, Printed Dec. 13, 2020, 10 pages, <https://docs.openshift.com/container-platform/4.3/applications/quotas/quotas-setting-per-project.html>.

"OpenShift Online plans and pricing", Red Hat OpenShift Online, Printed Dec. 13, 2020, 6 pages, <https://www.openshift.com/products/online/#plans-pricing>.

"Optimal Workload Placement for Public, Hybrid, and Private Clouds", Intel White Paper, 10 pages, <https://www.intel.com/content/dam/www/public/us/en/documents/white-papers/optimal-workload-placement-for-public-hybrid-and-private-clouds-white-paper.pdf>.

"Planning your cluster network setup", IBM, Nov. 19, 2020, 26 pages, <https://cloud.ibm.com/docs/containers?topic=containers-plan_clusters>.

"Planning your worker node setup", IBM, Printed Dec. 13, 2020, 18 pages, <https://cloud.ibm.com/docs/openshift?topic=openshift-planning_worker_nodes>.

"Using CPU Manager" Using CPU Manger/Open Sift Container/ Scalability and Performance, Printed Sep. 10, 2020, 7 pages, <https://docs.openshift.com/container-platform/4.4/scalability_and_performance/using-cpu-manager.html>.

"What is Global Server Load Balancing", GSLB Load Balancer—Multi-site GEO Load Balancing, Printed Oct. 8, 2020, 10 pages, <https://ns1.com/dns-global-server-load-balancing>.

Brown, Maxim, "Open Shift Monitoring Tools", Datadog, Apr. 15, 2020, 17 pages, <https://www.datadoghq.com/blog/openshift-monitoring-tools/>.

Marshak et al., "Evaluating Web User Perceived Latency Using Server Side Measurements", Computer Communications, vol. 26, Issue 8, May 20, 2003, pp. 872-887 <http://cs.tau.ac.il/~hanoch/Papers/eval_web_latency30.pdf>.

Mell et al., "The NIST Definition of Cloud Computing", Recommendations of the National Institute of Standards and Technology, Special Publication 800-145, Sep. 2011, 7 pages.

Nicholson, Paul, What is Global Server Load Balancing (GSLB)?, A10 Networks, Jul. 10, 2020, 4 pages, <https://www.a10networks.com/blog/what-is-global-server-load-balancing/>.

Stefanic et al., "Non-Functional Requirements Optimisation for Multi-Tier Cloud Applications: An Early Warning System Case Study", Proceedings of the 2017 IEEE SmartWorld, Ubiquitous Intelligence & Computing, Advanced & Trusted Computed, Scalable Computing & Communications, Cloud & Big Data Computing, Internet of People and Smart City Innovation (SmartWorld/SCALCOM/UIC/ATC/CBDCom/IOP/SCI), Aug. 4-8, 2017, San Francisco, California, 9 pages.

Subramaniam et al., "CPU Manager", Kubernetes Blog, Jul. 24, 2018, 8 pages, <https://kubernetes.io/blog/2018/07/24/feature-highlight-cpu-manager/>.

Taherizadeh et al. "Dynamic Multi-level Auto-scaling Rules for Containerized Applications", The Computer Journal, vol. 62, Issue 2, Feb. 2019, pp. 174-197, <https://academic.oup.com/comjnl/article/62/2/174/4993728>.

Wu et al., "Dynamically Adjusting Scale of a Kubernetes Cluster Under QoS Guarantee", Proceedings of the 2019 IEEE 25th International Conference on Parallel and Distributed Systems (ICPADS), Dec. 4-6, 2019, Tianjin, China, 8 pages. <https://ieeexplore.ieee.org/document/8975761>.

* cited by examiner

CLUSTER SELECTION FOR WORKLOAD DEPLOYMENT

BACKGROUND

The present invention relates generally to the field of multicloud, and more particularly to estimating cost(s) and/or coordinating the placement of workloads among on-premise resources and/or various cloud computing resources based on received workload requirements.

Cloud computing is the on-demand availability of computer system resources, especially data storage and computing power, without direct active management by the user. In cloud computing, functions are often distributed over multiple locations from central servers. Clouds may be limited to a single organization (enterprise cloud), or be available to many organizations (public cloud)

Multicloud refers to the distribution of cloud assets, software, applications, etc. across several cloud-hosing environments. A typical multicloud architecture utilizes multiple public clouds and/or private clouds. A multicloud environment aims to eliminate reliance on any single cloud provider.

SUMMARY

Aspects of an embodiment of the present invention disclose a computer-implemented method, computer program product, and computer system. A processor receives a request to deploy a workload in a container environment, where: the container environment comprises a plurality of external providers running container environment clusters; and the request (i) includes one or more requirements of the workload and (ii) does not specify a particular external provider of the plurality of external providers. A processor determines a cluster, from the plurality of external providers running the container environment clusters, that meets the one or more requirements of the workload. A processor deploys the workload on the determined cluster.

DETAILED DESCRIPTION

Figure 1:
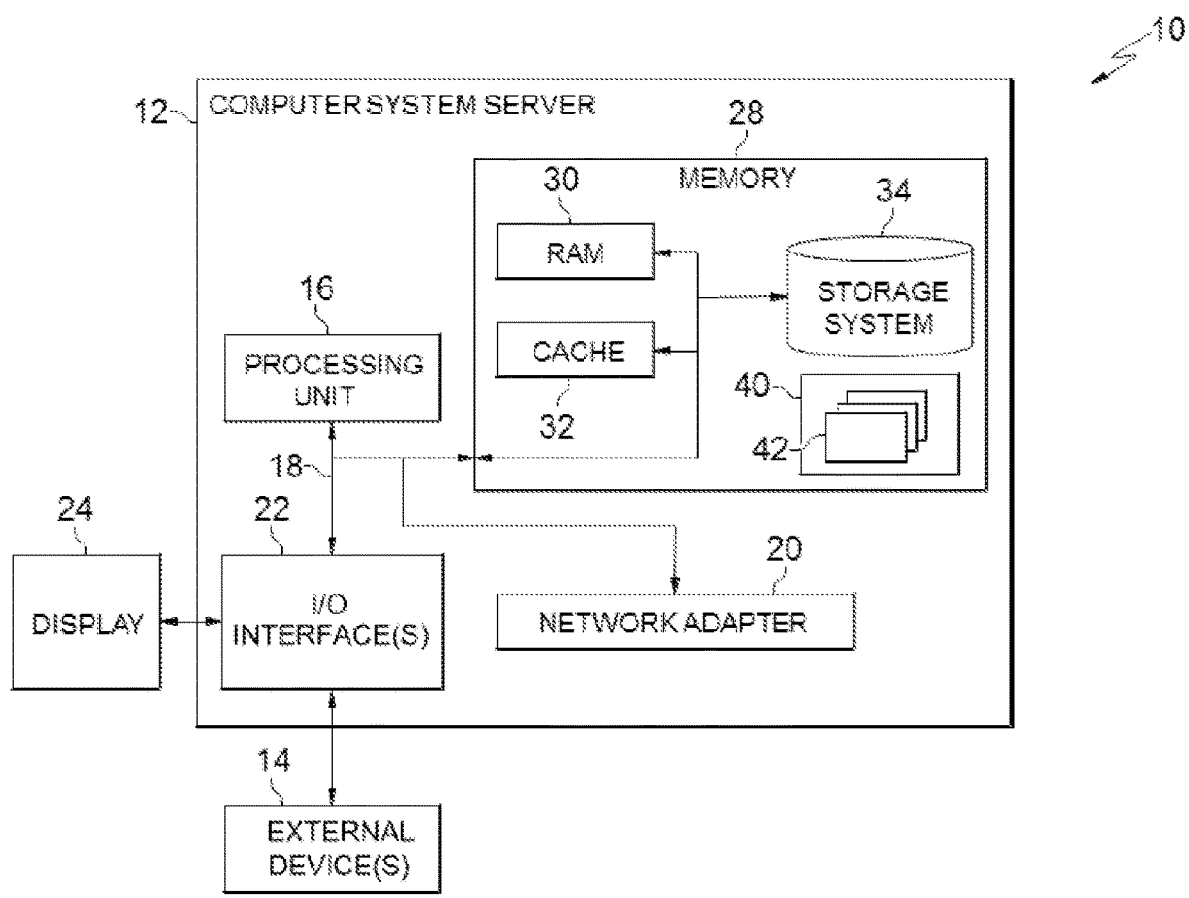
FIG. 1 depicts a cloud computing node according to an embodiment of the present invention.

Embodiments of the present invention recognize that utilizing multicloud can cause increased complexity of management (managed-from) and managed (managed-to) environments. Embodiments of the present invention further recognize challenges that exist when customers have to interact with a variety of underlying cloud vendors and the potential risks associated with vendor lock-in. Embodiments of the present invention provide an approach that uses open-source container-orchestration (e.g., Kubernetes®) to create a multitenant overlay (herein referred to as a universal public cloud) over the multicloud a determine placement of workloads based on requirements associated with the workload and other metrics (e.g., latency, cost). Embodiments of the present invention allow a tenant to specify quality of service (QoS), security, geographic, computing, and other workload requirements and receive cost estimates or have the workload be placed without having the tenant interact with the underlying cloud providers.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
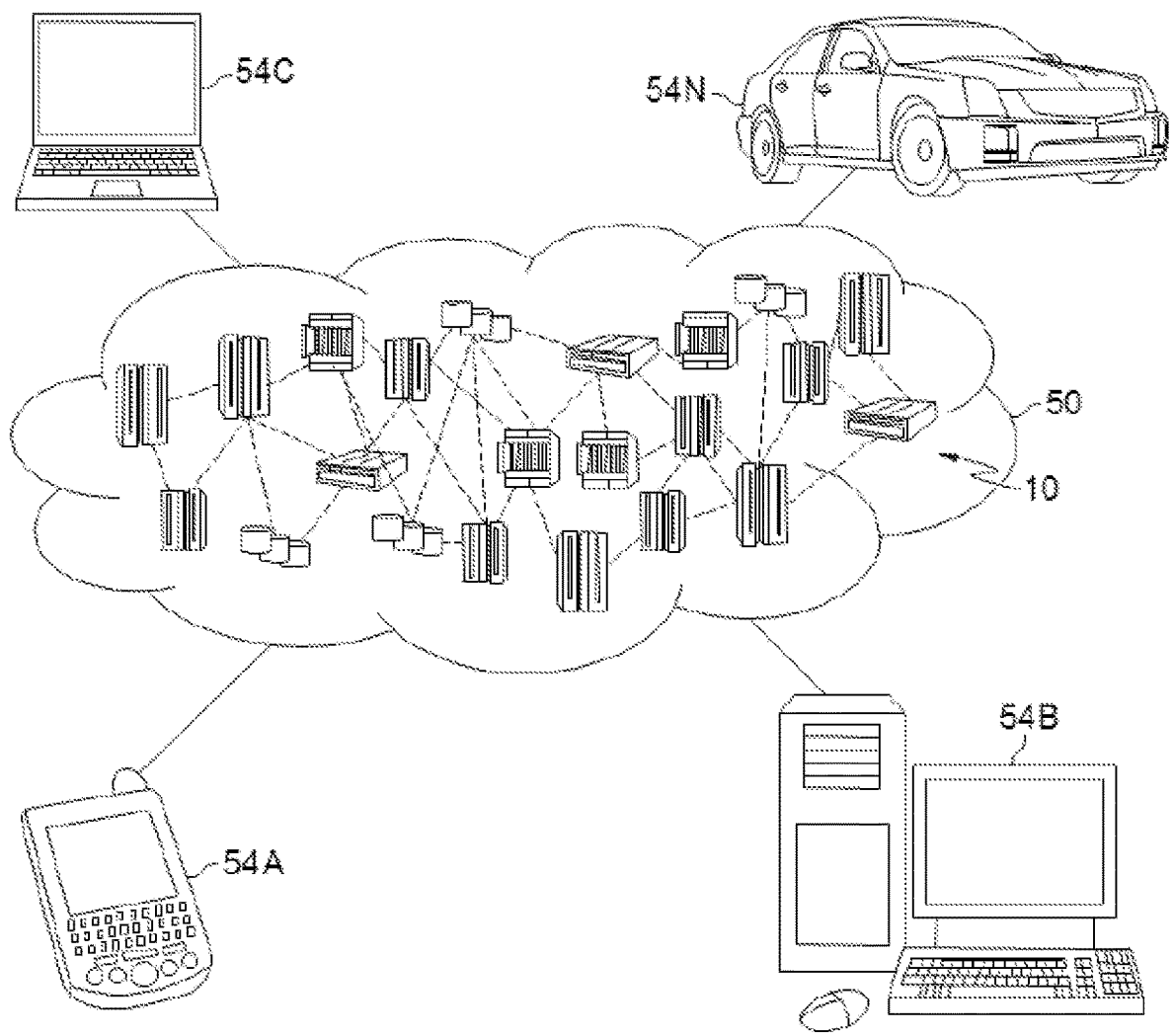
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
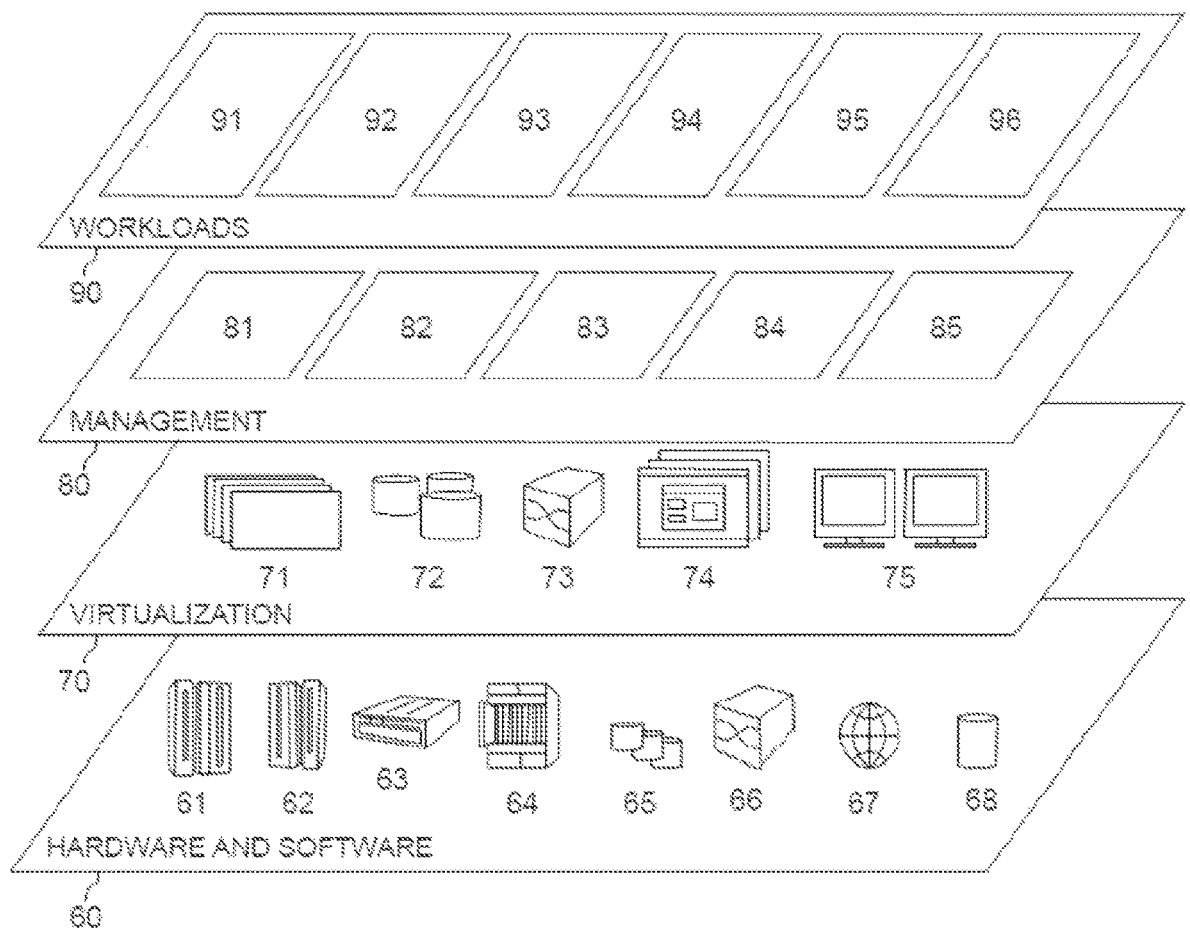
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Figure 4:
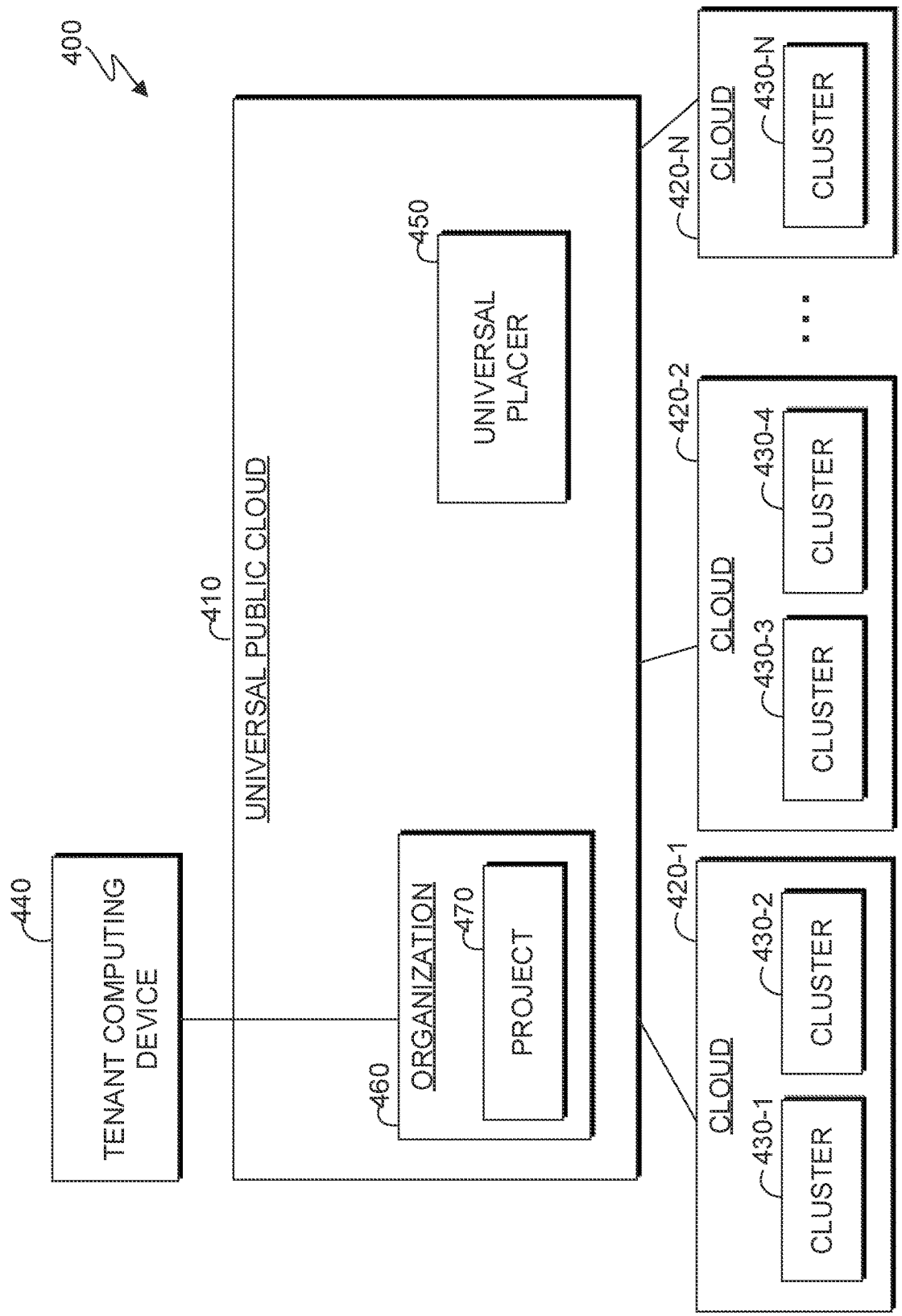
FIG. 4 depicts a block diagram of a computing environment according to an embodiment of the present invention.

FIG. 4 is a functional block diagram illustrating a computing environment, generally designated 400, in accordance with one embodiment of the present invention. Computing environment 400 is a partial depiction of one example of an architecture of cloud computing environment 50, as described in reference to FIG. 2. FIG. provides only an illustration of one embodiment and does not imply any limitations with regard to the environments in which different embodiments may be implemented.

In the depicted embodiment, computing environment 400 includes universal public cloud, clouds 420-1 through clouds 420-N (as used herein, clouds 420-1 through 420-N may be collectively referred to as clouds 420 or, individually referred to specifically or more generically as cloud 420), and tenant computing device 440 interconnected over a network (not shown). The network may be a local area network (LAN), a wire area network (WAN), such as the Internet, the public switched telephone network (PSTN), any combination thereof, or any combination of connections and protocols that will support communications between universal public cloud 410 and clouds 420, as well as universal public cloud 410 and tenant computing device 440. The network may include wired, wireless, or fiber optic connections. Computing environment 400 may include additional servers, computing devices, or other devices not shown.

Universal public cloud 410 may be a management server, a web server, or any other electronic device or computing system capable of receiving and sending data. In some embodiments, universal public cloud 410 may be a laptop computer, tablet computer, a personal computer (PC), a desktop computer, or any programmable electronic device capable of communicating with tenant computing device 440 and clouds 420. In one embodiment, universal public cloud 410 represents a node, such as node 10, of a cloud computing environment, such as cloud computing environment 50 (see FIG. 2). In some embodiments, universal public cloud 410 may represent a computing system utilizing clustered computers and components to act as a single pool of seamless resources. In the depicted embodiment, universal public cloud 410 contains, at least, universal placer 450 and organization 460, as created by tenant computing device 440 such that project 470 can be deployed on one or more of clouds 420-1 through 420-N. While not depicted, it is also contemplated that universal public cloud 410 may be capable of processing and deploying any necessary workload(s) associated with project 470 by utilizing on-premises computing resources. In general, universal public cloud 410 acts as a managed service managing a plurality of clusters (e.g., Kubernetes® clusters) created across a plurality of clouds 420, the clouds 420 potentially managed by separate and distinct cloud providers, such that a tenant is precluded from selecting particular cloud providers and, instead, universal public cloud 410 acts as an intermediary concerning the placement of workloads on clouds 420.

Clouds 420 each represent particular clouds offered by a cloud service provider. Computing environment 400 may include any number of clouds 420. Each cloud is capable of running one or more clusters 430 (as described herein, individual clusters may be referred to as cluster 430-1 through cluster 430-N, or more generally as cluster 430). A cluster is a set of nodes that run containerized applications. In some embodiments, each of clusters 430 are Kubernetes® clusters. Clusters allow containers to run across multiple machines and environments: virtual, physical, cloud-based, and on-premises. Clusters include, at least, a control plane and one or more compute machines, or nodes. The control plane is responsible for maintaining the desired state of the cluster, such as which applications are running and which container images they use. Nodes actually run the applications and workloads. A cloud 420 may include any number of clusters 430.

Tenant computing device 440 may be a desktop computer, laptop computer, tablet computer, or server. In general, tenant computing device 440 may be any computing device capable of sending/receiving data and communicating with universal public cloud 410 over a network (not shown). In general, a tenant at tenant computing device 440 creates an organization, such as organization 460 and creates a project, such as project 470, within the organization 460, where the project includes workload requirements and a request to deploy workload(s) for deployment of project 470. Details associated with organization 460 and project 470 may be stored to a repository on universal public cloud 410. Additionally, universal public cloud 410 may maintain a mapping of tenants to various resources that they have across clouds 420, along with workload requirements associated with organization 460 and project 470. While only a single tenant is depicted in FIG. 1, embodiments of the present invention contemplate a plurality of tenants, and recognize that each tenant may create one or more organizations. Further, within each organization, a tenant may create one or more projects.

Universal placer 450 operates to receive a request to deploy workload(s) associated with project 470, filter possible candidate clusters based: (i) on workload requirements, (ii) projected latency, and (iii) incremental costs, generate workload deployment scenario(s), provide price estimates, and/or deploy necessary workload(s) for project 470. Universal placer executes on universal public cloud 410. Universal placer 450 may be a dedicated deployment program, a function integrated within another program, such as an orchestration or software deployment program, or any other program or function that is capable of deploying workloads of project 470 on one or more clusters 430 of clouds 420.

Figure 5:
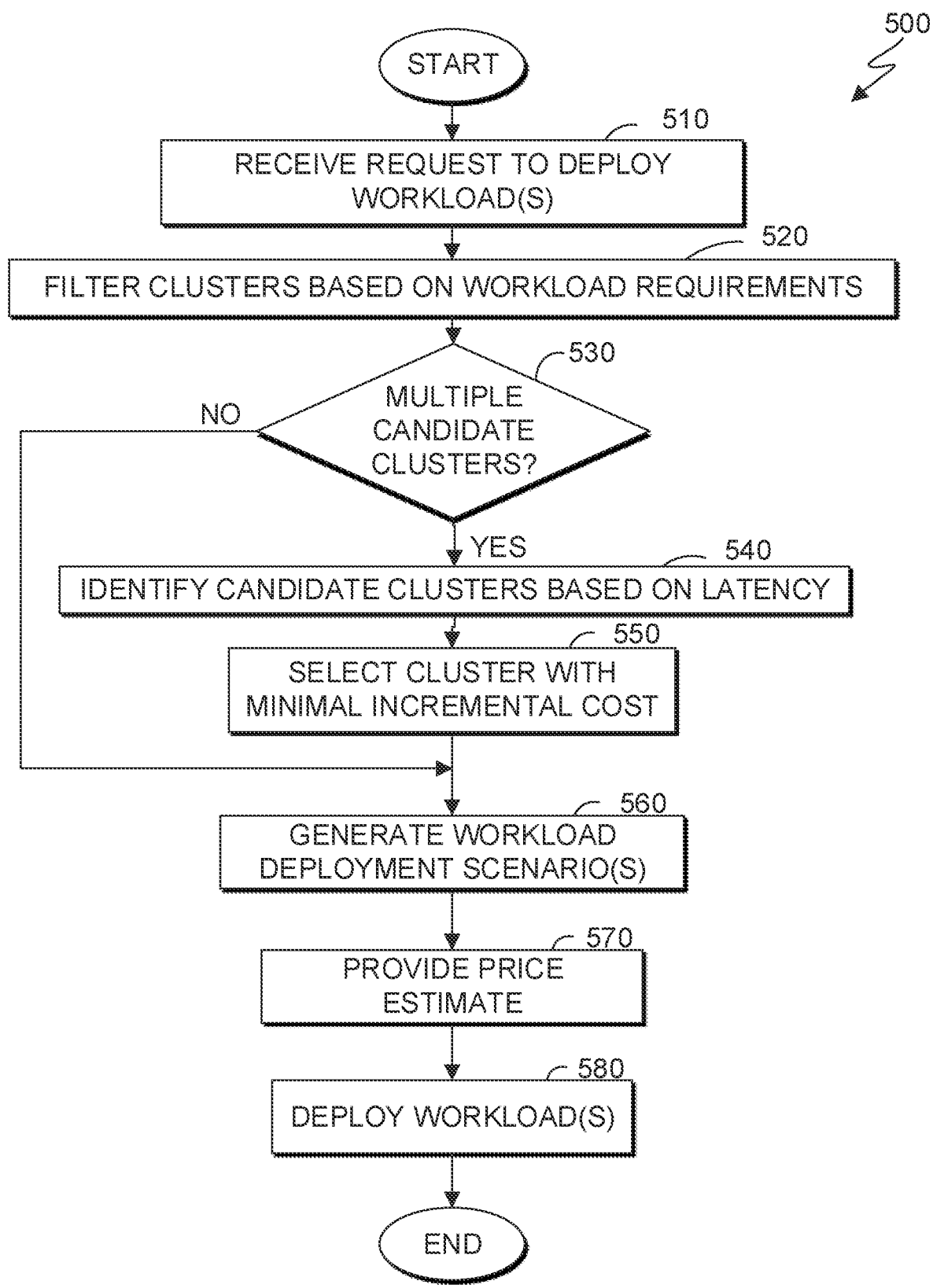
FIG. 5 is a flowchart depicting operational steps of a universal placer providing cost estimates and/or deploying a workload on one or more of a plurality of available clouds based on workload requirements and estimated performance/cost of the available clouds according to an embodiment of the present invention.

FIG. 5 is a flowchart 500 depicting operational steps of universal placer 450, executing within the computing environment of FIGS. 1-4, for providing cost estimates and/or deploying a workload on one or more of a plurality of available clouds based on workload requirements and estimated performance/cost of the available clouds, in accordance with an embodiment of the present invention.

In step 510, universal placer 450 receives a request from a tenant to deploy workload(s) of a project associated with an organization (e.g., organization 460), wherein the request includes workload requirements. A variety of workload requirements may be defined by the tenant.

At an organization level, workload requirements may include budgetary limits for all of the projects within the organization (e.g., organization 460), budgetary limits on a per project basis (e.g., uniform, non-uniform budgetary limits), number of concurrent projects allowed, or other workload requirements.

At a project level, workload requirements may include budgetary limits for the project, quality of service (QoS) limits, nonfunctional requirements (NFRs), security requirements, and/or services. QoS limits may include, but are not limited to, QoS type (e.g., Exclusive, Guaranteed, Burstable, BestEffort), resource requests (i.e., the minimum amount of a resource that a pod asks for) and resource limits (i.e., the maximum amount of a resource that a pod can go up to) for resources such as computing power (e.g., virtual CPU (vCPU)) and memory (e.g., RAM). Exclusive QoS types are those that are assigned exclusive resources, such as CPU cores, and do not run in the shared resources pool. Guaranteed QoS types are those that include CPU and memory limits. Burstable QoS types are those that include a CPU or memory request. BestEffort QoS types are those that have neither CPU nor memory requests/limits. BestEffort QoS types are able to use any amount of free CPU and memory resources on a node.

In some embodiments, QoS limits are associated with t-shirt size selection. NFRs may include, but are not limited to, data residency location and end-user location requirements. NFRs may include a selection of single-zone (i.e., resources deployed to one geographic region) or multizone (i.e., resources spread across data centers in multiple zones to increase fault tolerance). Services may include, but at not limited to, best-of-breed services (e.g., particular required applications or services for the workload) that pods within the project are required to bind to an use.

Figure 6:
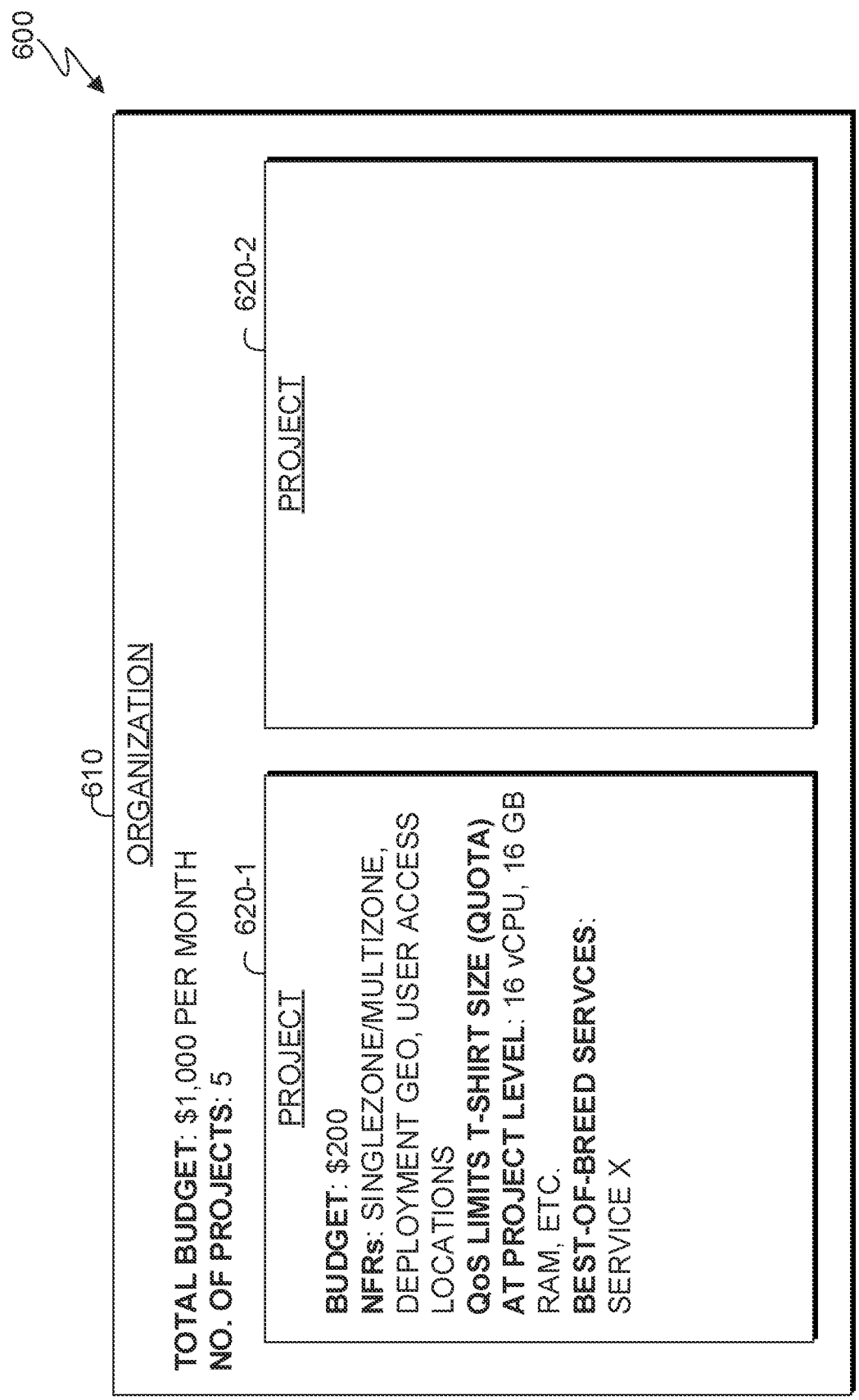
FIG. 6 depicts an example of an organization, created by a tenant, according to an embodiment of the present invention.

FIG. 6 depicts an example 600 of an organization 610 created by a tenant. In example 600, the tenant has specified workload requirements at the organizational level of organization 610 that include a total budget of $1,000 per month and a number of projects set to five (note that only two projects are depicted). Two projects 620 are present within the organization, more specifically referred to as project 620-1 and project 620-2. While project 620-2 has not yet been assigned project level workload requirements, project 620-1 specifies workload requirements associated with budget, NFRs, QoS limits tied to t-shirt size, and best-of-breed services required.

Referring back to FIG. 5, in step 520, universal placer 450 filters clusters based on the received workload requirements of the project to identify one or more clusters (e.g., clusters 430) that are candidates for deployment. The clusters may be located on any of clouds 420. As described above, workload requirements associated with a capability to may include QoS limits, data residency geography, best-of-breed services, and other workload requirements. In some embodiments, at step 520, universal placer 450 is filtering the clusters based on the capabilities to deploy the workload and is filtering based on workload requirements corresponding to aspects of that deployment, such as computing capabilities, compliance with geographic data storage requirements, while, at this time, not considering factors such as price and end user location (provided there is not a requirement that the end user and data reside in particular geographies).

In some embodiments, universal placer 450 creates production rules to identify the clusters (e.g., clusters 430) corresponding to the workload requirements described above. An example production rule is:

(QoS Limits t-shirt size, Data Residency Geo, Best-of-Breed Services-plan)→(<list of clusterids>).

The example production rule identifies a plurality of workload requirements that are defined in the antecedent of the production rule. Meanwhile, the dependent side of the production rule provides a list of cluster ids where the workload of the project can be deployed.

In the event that a new cluster (e.g., any of clusters 430-1 through 430-N) is added to one of clouds 420, universal placer 450 updates one or more of the production rules so that the new cluster appears in the dependent part of the applicable production rule (i.e., when the new cluster meets the workload requirements specified in the antecedent side of the production rule).

In the event that a new QoS Limit t-shirt size is created, universal placer 450 creates a new production rule with, at least, the QoS Limit t-shirt size specified in the antecedent side of the new production rule and the corresponding cluster id(s) specified in the dependent side of the new production rule.

In decision 530, universal placer 450 determines whether there are multiple candidate clusters. Based on the filtration (see step 520), universal placer 450 may determine whether only a single cluster exists or if multiple clusters exist that meet the workload requirements associated with deploying the workload of the project. In some embodiments, universal placer 450 may determine that no candidate clusters exist. In such an embodiment, universal placer 450 may return an error or notification to the tenant, such that the tenant is able to amend their workload requirements in order to potentially identify suitable clusters to implement the workload(s) of their project. If universal placer 450 determines that there are not multiple candidate clusters (decision 530, no branch), and only a single candidate cluster, universal placer 450 generates workload deployment scenario(s) (see step 560). If universal placer 450 determines that there are multiple candidate clusters (decision 530, yes branch), universal placer 450 identifies candidate clusters based on latency (step 540).

In step 540, universal placer 450 identifies candidate clusters, from the multiple candidate clusters identified during the initial filtration (see step 520), based on latency. Latency is the time it takes for data or a request to go from a source to a destination. As described above, some of the received workload requirements may include end user location. Universal placer 450 maintains latency estimates for end-user locations at the various clusters (e.g., clusters 430) of clouds 420. Universal placer 450 may maintain latency estimates by testing for network latency during various time periods or maintaining network latency data for already deployed workloads. Universal placer 450 may compare these latency estimates for candidate clusters to further narrow down the candidate clusters based on the estimated latency between the end-user location(s) and the candidate clusters. In some embodiments, a latency threshold is used. The latency threshold my specify a particular latency that may not be exceeded (e.g., if average latency between end-user location and cluster is above this threshold, that particular cluster will no longer be a candidate). In other embodiments, the latency threshold may specify that the lowest latency cluster, or lowest latency N number of clusters, should remain as candidates.

Universal placer 450 may generate and maintain a matrix that includes end-user locations on one axis and the various clusters 430-1 on the other axis. Universal placer 450 may populate the fields of such a matrix with latency data.

While latency is described here, in some embodiments, universal placer performs similar tasks related to step 540, but instead, such tasks are based on end-user closeness to the clusters 430 of each cloud 420. For example, physical distance may form the basis of this identification rather than latency estimates.

In step 550, universal placer 450 selects a cluster, or the remaining clusters, that minimizes incremental cost. If the only remaining clusters have Exclusive or Guaranteed QoS types, universal placer 450 selects a cluster with the lowest incremental cost. Alternatively, if at least one of the remaining clusters has a QoS type of Burstable or BestEffort, universal placer selects a cluster with the lowest incremental cost that would maximize unutilized capacity. Clusters may scale out or scale in based on, for example, threshold metrics (described below). As described above, both Burstable and BestEffort QoS types are potentially scalable, and accordingly, may be able to take advantage of unutilized capacity. Such unutilized capacity may be priced or may be unpriced, depending on the pricing structure of cloud provider.

In some embodiments, universal placer 450 determines which cluster minimizes the incremental cost by estimating the probability of scale out for each cluster. Universal placer 450 may utilize a recurrent neural network (RNN) to estimate the probability of scale out for each cluster. A RNN is a class of artificial neural networks where connections between nodes for a directed graph along a temporal sequence which allows the RNN to exhibit temporal dynamic behavior. RNNs can be used for time series prediction when each state is taken at successive equally spaced points in time to see changes over time. For each of the clusters 420-1 through 420-N, universal placer 450 may generate a RRN that uses one or more key metrics as input. The metrics may include, but are not limited to, workload deployment scenario, cluster state metrics, resource metrics, cluster events, and control plane metrics.

Workload deployment scenario includes, for example, the pods' requests and limits based on client provided pod specifications as well as any pods that are being deployed.

Cluster state metrics provide information on the state of various objects in Kubernetes®, such as pods and nodes, and provide a picture of a production environment's performance. Cluster state metrics may provide information on the current health status of a node, a number of desired pods specified for deployment, a number of pods currently running in a deployment, a number of pods currently available for a deployment, a number of pods currently not available for a deployment, as well as other information.

Resource metrics provide information on CPU, memory, and other resource utilization. Comparing available resources to requested resources can show whether or not the cluster has the capacity to accept new workloads and can run the current state without failures. In some environments, such as a Kubernetes® type environment, resource metrics are emitted from individual containers and can be retrieved at the pod level, which will be the sum of all the containers' resources. Some example information that resource metrics may provide include a number of requested resources by a container (e.g., the sum of memory resources requested by a namespace and a pod in a particular node), a limit requested for each resource of a container, capacity of each resource in the node with the unit quantity, and a number of different allocated resources of a node that are available for scheduling.

Cluster events are based on events reports on pod lifecycles and deployments. For example, tracking pod failures can be an indicator of misconfigured launch manifests. Correlating cluster events with resource metrics and cluster state metrics can help identify possible issues, such as insufficient node capacity.

Control plane metrics are metrics that show how control plane connectivity is working in a cluster. Any surge or spike of such metrics might indicate that there are issues in need of attention. Control plane metrics may provide visibility into how much time a request is taking to be processed, how much latency is observed, or show other latency-related data.

Universal placer 450 may monitor the state of clusters over a particular time interval and, for example, sample the state of the each cluster each time the particular time interval has passed (e.g., sample once every ten minutes). Universal placer 450 uses the RNN to keep track of how many stages (different samples of the state of the cluster) occur without any intervening scale ins or scale outs. When a cluster scales out, universal placer 450 creates a training sample with a probability of scale out being one for the number of monitored states that had occurred prior to the scale out without any intervening scale ins or scale outs. For other sequences with the same number of monitored states, universal placer 450 exponentially discounts the probability of scale out by the time difference of the last monitored sample and the next scale out. When a cluster scales in, universal placer 450 creates a training sample with a probability of scale out being zero for the number of monitored states that has occurred prior to the scale in without any intervening scale ins or scale outs. The output of the trained model is a probability of scale out for the cluster (e.g., any cluster of clusters 430-1 through 430-N).

In step 560, universal placer 450 generates workload deployment scenarios using pod specifications of the selected cluster. The workload deployment scenario generated by universal placer 450 includes: (i) a deployment configuration, which describes the desired state of a particular component of the application as a pod template, (ii) one or more replication controllers, which contain a point-in-time record of the state of a deployment configuration as a pod template, and (iii) one or more pods, which represent an instance of a particular version of an application. In general, based on available pod specifications, workload deployment scenarios may include a higher number of smaller pods (e.g., lower CPU and memory resources per pod) or a smaller number of larger pods (e.g., larger CPU and memory resources per pod). In some embodiments, there may be multiple deployment scenarios. In other embodiments, there may only be a single deployment scenario.

In step 570, universal placer 450 provides a price estimate to the tenant. In some embodiments, universal placer 450 may send the price estimate to the tenant at tenant computing device 440 via a network connection. Universal placer 450 generates the price estimate based on pricing factors associated with the generated deployment scenario(s). In some embodiments, a four-tuple rule is used for generating a pricing quote that includes the QoS limit t-shirt size, pod specifications, cloud datacenter, and cluster id. Universal placer 450 may further obtain pricing details from the cloud 420 associated with the selected cluster, and the price may be based on QoS limits, NFRs, Services, external vendor prices for resources (e.g., best of breed services), and additionally costs incurred by utilizing universal public cloud 410. Universal placer 450 may use these factors to generate a pricing quotation for both minimum and maximum pricing estimates driven by the pod specifications. The exact calculation of the price estimate is based on implementation details and may vary based on cloud provider pricing structures associated with the cloud 420. Similarly, embodiments of the present invention recognize that cloud providers may change pricing and, accordingly, subsequent iterations of the steps described herein can be performed to update price estimates and, possibly, recommend alternate clusters for deploying the workload(s) of the project.

In step 580, universal placer 450 creates the project on the selected cluster and deploys the workload. Typically, universal placer 450 will receive confirmation from the tenant via tenant computing device 440 after providing the price estimate and, in response to such confirmation, will create the project on the selected cluster, and deploy workload(s) on one or more pods of the cluster. In some embodiments, the tenant is not made aware of the selected cluster and the tenant is unaware of which cloud 420 the project is to be deployed.

In some embodiments, subsequent to creation of the project and deployment of the workloads, universal placer 450 may identify different cluster(s) that may further reduce latency based on, at least, end-user access location(s). Universal placer 450 may utilize global server load balancing (GSLB) to determine clusters that may lead to a reduction in average latency. GSLB is the practice of distributing internet traffic amongst a large number of connected servers dispersed around the world. Internet protocol (IP) based geographic location, identified network performance, and number of connections from internet service provider (ISPs) information may be used by universal placer 450. Universal placer 450 may further receive domain name service (DNS) requests from end users of the applications provided by the project and universal placer 450 may use this information to identify a weighted average latency seen by all of the end users. In one embodiment, universal placer 450 may calculate the weighted average latency for a cluster as a function of the number of connections from an end user location and the latency estimate from that location. Collectively, universal placer 450 uses the collected information to estimate which clusters 430-1 through 430-N are closer to an ISP or geographical location to determine whether a reduction in latency is possible. If there is a possibility of reducing latency, while still maintaining other requirements of the project, universal placer 450 may generate a recommendation to migrate to a different cluster. In some embodiments, universal placer 450 may generate such a recommendation regardless of whether the migration would result in a lower or a higher price. Typically, universal placer 450 also includes information detailing the change in price and/or the total price that would occur if the migration occurred. Similarly to step 580, in universal placer 450 receives confirmation that the tenant desires to perform the migration, universal placer 450 migrates the project to the new cluster and deploys the respective workloads.

Universal placer 450 maintains an externalized tenant mapping within various clouds 420 ad clusters 430 by, upon specification of a new project, recording (i) a tenant to project to cloud to mesh to cluster mapping and (ii) workload requirements such as the QoS limits, NFRs, and best of breed requirements. Subsequent to any migration or updates to the project (e.g., updates to workload requirements), universal placer 450 updates the externalized mapping. Via the externalized mapping, universal placer 450 can aggregate, on demand, information about, for example, Kubernetes® objects, replication, configuration, volumes, best of breed services. Such externalization allows universal placer 450 to keep track of usage across clusters on which a workload runs and to provide a consolidated bill based on usage, even across multiple clusters.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
receiving, by one or more processors, a request to deploy a workload in a container environment, wherein:
the container environment comprises a plurality of service providers running container environment clusters; and
the request (i) includes one or more requirements of the workload and (ii) does not specify a particular service provider of the plurality of service providers;
determining, by one or more processors, a cluster, from the plurality of service providers running the container environment clusters, that meets the one or more requirements of the workload;
deploying, by one or more processors, the workload on the determined cluster;
subsequent to deploying the workload on the determined cluster, monitoring, by one or more processors, an actual end-user access location of the deployed workload;
calculating a weighted average latency as seen by a plurality of end users for the determined cluster as a function of a number of connections and a latency estimate from the actual end-user access location and received domain name service (DNS) requests from the plurality of end users of applications of the workload;
determining, by one or more processors, a second cluster with lower latency than the cluster for the actual end-user location based in part on the weighted average latency and utilizing global server load balancing indicating clusters that lead to a reduction in average latency for the plurality of end users; and
generating, by one or more processors, a recommendation to migrate the workload to the second cluster.

2. The computer-implemented method of claim 1, further comprising: prior to deploying the workload on the determined cluster, providing, by one or more processors, a price estimate for running the workload on the determined cluster.

3. The computer-implemented method of claim 1, wherein determining the cluster that meets the one or more requirements of the workload further comprises:
determining, by one or more processors, a plurality of clusters having a latency estimate below a latency threshold with respect to an end-user location identified in the request; and
determining, by one or more processors, that the cluster has a lowest cost estimate of the plurality of clusters.

4. The computer-implemented method of claim 3, wherein determining that the cluster has the lowest cost estimate of the plurality of clusters comprises:
determining, by one or more processors, a probability of scale out for each of the plurality of clusters by utilizing a recurrent neural network (RNN),
wherein: the RNN includes as input, at each stage, cluster state metrics, resource metrics, cluster events, and control plane metrics; and
the RNN creates a training sample each time a scale change occurs.

5. The computer-implemented method of claim 1, wherein the plurality of service providers running container environment clusters are a plurality of cloud service providers and the request to deploy the workload in the container environment is a request to deploy the workload using a cloud service provider.

6. The computer-implemented method of claim 1, wherein the container environment is Kubernetes.

7. The computer-implemented method of claim 1, wherein the one or more requirements of the workload are selected from the group consisting of: budgetary limits, quality of service (QoS) type, central processing unit (CPU) requirements, random access memory (RAM) requirements, data residency location, and best-of-breed services.

8. A computer program product comprising:
one or more computer readable storage media, and program instructions collectively stored on the one or more computer readable storage media, the program instructions comprising:
program instructions to receive a request to deploy a workload in a container environment, wherein:
the container environment comprises a plurality of service providers running container environment clusters; and
the request (i) includes one or more requirements of the workload and (ii) does not specify a particular service provider of the plurality of service providers; program instructions to determine a cluster, from the plurality of service providers running the container environment clusters, that meets the one or more requirements of the workload;
program instructions to deploy the workload on the determined cluster;
program instructions to, subsequent to deploying the workload on the determined cluster, monitor, by one or more processors, an actual end-user access location of the deployed workload;
program instructions to calculate a weighted average latency as seen by a plurality of end users for the determined cluster as a function of a number of connections and a latency estimate from the actual end-user access location and received domain name service (DNS) requests from the plurality of end users of applications of the workload;
program instructions to determine a second cluster with lower latency than the cluster for the actual end-user location based in part on the weighted average latency and utilizing global server load balancing indicating clusters that lead to a reduction in average latency for the plurality of end users; and
program instructions to generate a recommendation to migrate the workload to the second cluster.

9. The computer program product of claim 8, further comprising:
program instructions, collectively stored on the one or more computer readable storage media, to, prior to deploying the workload on the determined cluster, provide a price estimate for running the workload on the determined cluster.

10. The computer program product of claim 8, wherein program instructions to determine the cluster that meets the one or more requirements of the workload further comprise:
 program instructions, collectively stored on the one or more computer readable storage media, to determine a plurality of clusters having a latency estimate below a latency threshold with respect to an end-user location identified in the request; and
 program instructions, collectively stored on the one or more computer readable storage media, to determine that the cluster has a lowest cost estimate of the plurality of clusters.

11. The computer program product of claim 10, wherein program instructions to determine that the cluster has the lowest cost estimate of the plurality of clusters comprise:
 program instructions to determine a probability of scale out for each of the plurality of clusters by utilizing a recurrent neural network (RNN), wherein:
  the RNN includes as input, at each stage, cluster state metrics, resource metrics, cluster events, and control plane metrics; and
  the RNN creates a training sample each time a scale change occurs.

12. The computer program product of claim 8, wherein the plurality service providers running container environment clusters are a plurality of cloud service providers and the request to deploy the workload in the container environment is a request to deploy the workload using a cloud service provider.

13. The computer program product of claim 8, wherein the container environment is Kubernetes.

14. The computer program product of claim 8, wherein the one or more requirements of the workload are selected from the group consisting of: budgetary limits, quality of service (QoS) type, central processing unit (CPU) requirements, random access memory (RAM) requirements, data residency location, and best-of-breed services.

15. A computer system comprising:
 one or more computer processors, one or more computer readable storage media, and program instructions collectively stored on the one or more computer readable storage media for execution by at least one of the one or more computer processors, the program instructions comprising:
 program instructions to receive a request to deploy a workload in a container environment, wherein:
 the container environment comprises a plurality of service providers running container environment clusters; and
 the request (i) includes one or more requirements of the workload and (ii) does not specify a particular service provider of the plurality of service providers;
 program instructions to determine a cluster, from the plurality of service providers running the container environment clusters, that meets the one or more requirements of the workload;
 program instructions to deploy the workload on the determined cluster;
 program instructions to, subsequent to deploying the workload on the determined cluster, monitor, by one or more processors, an actual end-user access location of the deployed workload;
 program instructions to calculate a weighted average latency as seen by a plurality of end users for the determined cluster as a function of a number of connections and a latency estimate from the actual end-user access location and received domain name service (DNS) requests from the plurality of end users of applications of the workload;
 program instructions to determine a second cluster with lower latency than the cluster for the actual end-user location based in part on the weighted average latency and utilizing global server load balancing indicating clusters that lead to a reduction in average latency for the plurality of end users; and
 program instructions to generate a recommendation to migrate the workload to the second cluster.

16. The computer system of claim 15, further comprising: program instructions, collectively stored on the one or more computer readable storage media for execution by at least one of the one or more computer processors, to, prior to deploying the workload on the determined cluster, provide a price estimate for running the workload on the determined cluster.

17. The computer system of claim 15, wherein program instructions to determine the cluster that meets the one or more requirements of the workload further comprise:
 program instructions, collectively stored on the one or more computer readable storage media for execution by at least one of the one or more computer processors, to determine a plurality of clusters having a latency estimate below a latency threshold with respect to an end-user location identified in the request; and
 program instructions, collectively stored on the one or more computer readable storage media for execution by at least one of the one or more computer processors, to determine that the cluster has a lowest cost estimate of the plurality of clusters.

18. The computer system of claim 15, wherein the one or more requirements of the workload are selected from the group consisting of: budgetary limits, quality of service (QoS) type, central processing unit (CPU) requirements, random access memory (RAM) requirements, data residency location, and best-of-breed services.

* * * * *